United States Patent
Wu et al.

(10) Patent No.: US 9,986,510 B2
(45) Date of Patent: May 29, 2018

(54) METHOD AND NETWORK SIDE NETWORK ELEMENT FOR IMPROVING DOWNLINK TRANSMIT POWER AND STORAGE MEDIUM

(71) Applicant: ZTE CORPORATION, Shenzhen, Guangdong Province (CN)

(72) Inventors: Hao Wu, Shenzhen (CN); Hongwei Lou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days. days.

(21) Appl. No.: 15/118,488

(22) PCT Filed: Sep. 24, 2014

(86) PCT No.: PCT/CN2014/087269
§ 371 (c)(1),
(2) Date: Aug. 12, 2016

(87) PCT Pub. No.: WO2015/127781
PCT Pub. Date: Sep. 3, 2015

(65) Prior Publication Data
US 2017/0181101 A1     Jun. 22, 2017

(30) Foreign Application Priority Data
Feb. 25, 2014    (CN) .......................... 2014 1 0064161

(51) Int. Cl.
*H04W 52/14*    (2009.01)
*H04W 52/28*    (2009.01)
(Continued)

(52) U.S. Cl.
CPC ....... *H04W 52/143* (2013.01); *H04W 52/221* (2013.01); *H04W 52/223* (2013.01);
(Continued)

(58) Field of Classification Search
CPC ......... H04B 7/024; H04B 7/26; H04L 5/0035; H04L 5/005; H04L 5/0053
(Continued)

(56) References Cited

U.S. PATENT DOCUMENTS

2004/0077370 A1 *  4/2004  Dick ..................... H04W 52/12
                                                             455/522
2004/0190486 A1 *  9/2004  Oshiba .................. H04L 1/0034
                                                             370/349
(Continued)

FOREIGN PATENT DOCUMENTS

CN         102655681 A     9/2012
CN         102761891 A    10/2012
(Continued)

OTHER PUBLICATIONS

R1-103169; Power Scaling for LTE-A; 3GPP TSG RAN WG1 Meeting #61; Montreal, Canada, May 10-14, 2010.
(Continued)

*Primary Examiner* — Tan H Trinh
(74) *Attorney, Agent, or Firm* — Ling Wu; Stephen Yang; Ling and Yang Intellectual Property

(57) ABSTRACT

The embodiment of the present document discloses a method for improving downlink transmission power. The method includes: when a network side network element determines that a downlink subframe in a radio frame is an almost blank subframe, assigning a maximum value among numerical values corresponding to a user level parameter to the user level parameter, and assigning a maximum value among numerical values corresponding to a cell level parameter to the cell level parameter; and determining downlink transmission power according to the user level parameter value and the cell level parameter value. The embodiment of the present document further discloses a
(Continued)

network side network element for improving downlink transmission power and a storage medium.

6 Claims, 1 Drawing Sheet

(51) Int. Cl.
 *H04W 52/22* (2009.01)
 *H04W 52/32* (2009.01)
(52) U.S. Cl.
 CPC ....... *H04W 52/226* (2013.01); *H04W 52/281* (2013.01); *H04W 52/282* (2013.01); *H04W 52/283* (2013.01); *H04W 52/285* (2013.01); *H04W 52/288* (2013.01); *H04W 52/325* (2013.01)
(58) Field of Classification Search
 USPC ... 455/69, 522, 41.1, 41.2, 90.3, 452.1, 561; 370/329, 328, 280, 252, 331
 See application file for complete search history.

(56) References Cited

U.S. PATENT DOCUMENTS

| | | | | |
|---|---|---|---|---|
| 2005/0083999 | A1* | 4/2005 | Koo | H04W 52/12 375/148 |
| 2010/0111021 | A1* | 5/2010 | Hui | H04W 72/04 370/329 |
| 2010/0331037 | A1* | 12/2010 | Jen | H04W 52/146 455/522 |
| 2011/0177838 | A1* | 7/2011 | Olszewski | H04W 52/42 455/522 |
| 2011/0194423 | A1* | 8/2011 | Cho | H04W 52/04 370/252 |
| 2011/0292846 | A1* | 12/2011 | Hu | H04W 72/00 370/280 |
| 2012/0196611 | A1* | 8/2012 | Venkatraman | H04W 52/143 455/450 |
| 2012/0238313 | A1* | 9/2012 | Zhou | H04W 52/286 455/522 |
| 2013/0039286 | A1* | 2/2013 | Larsson | H04W 52/146 370/329 |
| 2013/0157680 | A1* | 6/2013 | Morita | H04W 52/244 455/452.2 |
| 2013/0157709 | A1* | 6/2013 | Ji | H04W 52/04 455/522 |
| 2013/0229943 | A1* | 9/2013 | Huang | H04W 52/12 370/252 |
| 2014/0029565 | A1* | 1/2014 | Kim | H04L 5/001 370/329 |
| 2014/0043469 | A1* | 2/2014 | Engel | G01N 21/88 348/135 |
| 2014/0086203 | A1* | 3/2014 | Furuskar | H04W 52/143 370/330 |
| 2014/0119332 | A1* | 5/2014 | Kim | H04W 52/243 370/330 |
| 2014/0169322 | A1* | 6/2014 | Ouchi | H04W 52/146 370/329 |
| 2014/0177531 | A1* | 6/2014 | Imamura | H04W 24/10 370/328 |
| 2014/0254537 | A1* | 9/2014 | Kim | H04W 52/243 370/329 |
| 2014/0328309 | A1* | 11/2014 | Comstock | H04W 72/082 370/329 |
| 2014/0341093 | A1* | 11/2014 | Seo | H04W 52/143 370/280 |
| 2015/0016376 | A1* | 1/2015 | Seo | H04W 72/0406 370/329 |
| 2015/0016419 | A1* | 1/2015 | Kim | H04W 36/04 370/331 |
| 2015/0043406 | A1* | 2/2015 | Ko | H04W 52/325 370/311 |
| 2015/0043469 | A1* | 2/2015 | Kim | H04B 7/26 370/329 |
| 2015/0105119 | A1* | 4/2015 | Eriksson | H04W 52/146 455/522 |
| 2015/0207601 | A1* | 7/2015 | Kim | H04L 5/0048 370/329 |
| 2015/0215877 | A1* | 7/2015 | Ahn | H04W 52/365 455/522 |
| 2015/0236804 | A1* | 8/2015 | Lindoff | H04B 17/318 370/328 |
| 2016/0006529 | A1* | 1/2016 | Yi | H04J 11/0056 370/329 |
| 2016/0013921 | A1* | 1/2016 | Nagata | H04W 16/10 370/330 |
| 2016/0028533 | A1* | 1/2016 | Kazmi | H04W 72/1278 370/296 |
| 2016/0029321 | A1* | 1/2016 | Hwang | H04J 11/005 455/450 |
| 2016/0183203 | A1* | 6/2016 | Larsson | H04W 52/241 370/329 |
| 2016/0192356 | A1* | 6/2016 | Lee | H04W 52/325 370/280 |
| 2016/0227491 | A1* | 8/2016 | Park | H04W 52/325 |
| 2016/0227538 | A1* | 8/2016 | Seo | H04B 7/2615 |
| 2016/0242054 | A1* | 8/2016 | Lee | H04B 17/345 |
| 2016/0242125 | A1* | 8/2016 | Lee | H04W 52/246 |
| 2016/0374098 | A1* | 12/2016 | Jongren | H04L 1/0026 |
| 2017/0006501 | A1* | 1/2017 | Sesia | H04W 28/18 |
| 2017/0163360 | A1* | 6/2017 | Raghavan | H04B 17/309 |

FOREIGN PATENT DOCUMENTS

| | | |
|---|---|---|
| CN | 103533628 A | 1/2014 |
| JP | 2013038586 A | 2/2013 |
| JP | 2014003684 A | 1/2014 |
| WO | 2013118567 A1 | 8/2013 |
| WO | 2013133626 A1 | 9/2013 |
| WO | 2013139291 A1 | 9/2013 |

OTHER PUBLICATIONS

R1-122364; Further discussion on signalling support for reduced power ABS; New Postcom; 3GPP TSG RAN WG1 Meeting #69, Prague, Czech Republic, May 21-25, 2012.

R1-122698; Further Consideration on the Signaling Support for Reduced Power ABS; 3GPP TSG RAN WG1 Meeting #69, Prague, Czech Republic, May 21-25, 2012.

Samsung, PA and PB in non-zero Tx power ABS, 3GPP TSG RAN WG1 #68 Dresden, Germany, Feb. 6-10, 2012, R1-120166.

\* cited by examiner

METHOD AND NETWORK SIDE NETWORK ELEMENT FOR IMPROVING DOWNLINK TRANSMIT POWER AND STORAGE MEDIUM

TECHNICAL FIELD

The present document relates to an enhanced Inter-Cell Interference Coordination (eICIC) technology, in particular to a method and a network side network element for improving downlink transmission power and a storage medium.

BACKGROUND OF THE RELATED FIELD

Long Term Evolution (LTE) is a long term evolution result of Universal Mobile Telecommunications System (UMTS) technical standards formulated by the 3rd Generation Partnership Project (3GPP) organization.

A heterogeneous network in an LTE network is a very common networking mode in urban and hot spot areas. In urban or hot spot areas, buildings and users are densely distributed. Due to shielding and absorbing effects of buildings, signals sent by a macro station penetrate through various obstructions to reach indoor communication environments. Since there is a great amount of transmission losses, signals are very weak and high-quality data transmission cannot be provided to the users. If micro stations are disposed in an urban or hot spot areas covered by the macro station, the signals can be enhanced and the network throughput is improved. Thus the data transmission rate is improved. In addition, a micro station is a small cellular mobile communication base station which is low in power and cost, is easy to operate and can be self-purchased, self-configured and self-installed as required.

During actual application, since a great amount of micro stations exist and the coverage is overlapped with the coverage of the macro station, the problem of interference is serious. The traditional Inter-Cell Interference Coordination (ICIC) technology cannot effectively solve the inter-cell interference problem. In order to effectively solve the inter-cell interference problem, the eICIC technology was put forward in the 3GPP conference. However, in the eICIC technology, the downlink transmission power of the base station cannot be utilized effectively and the user experience is decreased.

SUMMARY

In order to solve the technical problem existing in the prior field, the embodiments of the present document provide a method and a network side network element for improving downlink transmission power and a storage medium. On the premise that the radio-frequency capability is not exceeded, the downlink transmission power of the network side network element can be improved to the greatest extent.

The technical solution of the embodiments of the present document is implemented as follows: a method for improving downlink transmission power comprises:

when a network side network element determines that a downlink subframe in a radio frame is an almost blank subframe, assigning a maximum value among numerical values corresponding to a user level parameter to the user level parameter, and assigning a maximum value among numerical values corresponding to a cell level parameter to the cell level parameter; and determining downlink transmission power according to the user level parameter value and the cell level parameter value.

Preferably, after determining the downlink transmission power according to the user level parameter value and the cell level parameter value, the method further comprises:

the network side network element determining whether the downlink transmission power is greater than radio-frequency maximum power of the network side network element, and if the downlink transmission power is greater than the radio-frequency maximum power of the network side network element, assigning a secondary maximum value among the numerical values corresponding to the user level parameter to the user level parameter, and assigning a secondary maximum value among the numerical values corresponding to the cell level parameter to the cell level parameter;

determining the downlink transmission power again according to the user level parameter value and the cell level parameter value; and sequentially cycling until the determined downlink transmission power is less than or equal to the radio-frequency maximum power of the network side network element.

Preferably, determining the downlink transmission power according to the user level parameter value and the cell level parameter value comprises:

determining $p_A$ according to the user level parameter value, wherein $p_A$ is a ratio of subcarrier power corresponding to a data section in an orthogonal frequency division multiplexing symbol not containing pilot to subcarrier power corresponding to a pilot section; determining $p_B$ according to the cell level parameter value, wherein $p_B$ is a ratio of subcarrier power corresponding to a data section in an orthogonal frequency division multiplexing symbol containing pilot to subcarrier power corresponding to a pilot section; and determining the downlink transmission power according to the user level parameter value, the cell level parameter value, $p_A$ and $p_B$.

The embodiment of the present document further provides a network side network element for improving downlink transmission power, comprising:

an assignment unit configured to, when a network side network element determines that a downlink subframe in a radio frame is an almost blank subframe, assign a maximum value among numerical values corresponding to a user level parameter to the user level parameter, and assign a maximum value among numerical values corresponding to a cell level parameter to the cell level parameter; and a determination unit configured to determine downlink transmission power according to the user level parameter value and the cell level parameter value.

Preferably, the network side network element further comprises:

a judgment unit configured to determine whether the downlink transmission power is greater than radio-frequency maximum power of the network side network element;

the assignment unit is further configured to, if the downlink transmission power is greater than the radio-frequency maximum power of the network side network element, assign a secondary maximum value among the numerical values corresponding to the user level parameter to the user level parameter, and assign a secondary maximum value among the numerical values corresponding to the cell level parameter to the cell level parameter; and the determination unit is further configured to determine the downlink transmission power according to the user level parameter value and the cell level parameter value obtained after assignment, and sequentially cycle until the determined downlink transmission power is less than or equal to the radio-frequency maximum power of the network side network element.

Preferably, the determination unit comprises a first determination subunit configured to determine $p_A$ according to the user level parameter value, wherein $p_A$ is a ratio of subcarrier power corresponding to a data section in an orthogonal frequency division multiplexing symbol not containing pilot to subcarrier power corresponding to a pilot section; and determine $p_B$ according to the cell level parameter value, wherein $p_B$ is a ratio of subcarrier power corresponding to a data section in an orthogonal frequency division multiplexing symbol containing pilot to subcarrier power corresponding to a pilot section; and a second determination subunit configured to determine the downlink transmission power according to the user level parameter value, the cell level parameter value, $p_A$ and $p_B$.

The method and the network side network element for improving the downlink transmission power and the storage medium provided by the embodiments of the present document can adjust assignments to the user level parameter $P_A$ value and the cell level parameter $P_B$ value, then adjust $p_A$ and $p_B$ and adjust the downlink transmission power according to the adjusted user level parameter $P_A$ value, the cell level parameter $P_B$ value, $p_A$ and $p_B$, such that the downlink transmission power value is enabled to be the maximum value under the condition that the radio-frequency capability of the network side network element is not exceeded, thus the performance of the eICIC technology can be improved and the performance of the LTE system can be improved.

SPECIFIED EMBODIMENTS

The implementation modes of the present document will be described below in detail in combination with the preferred embodiments and the drawings.

Figure 1:
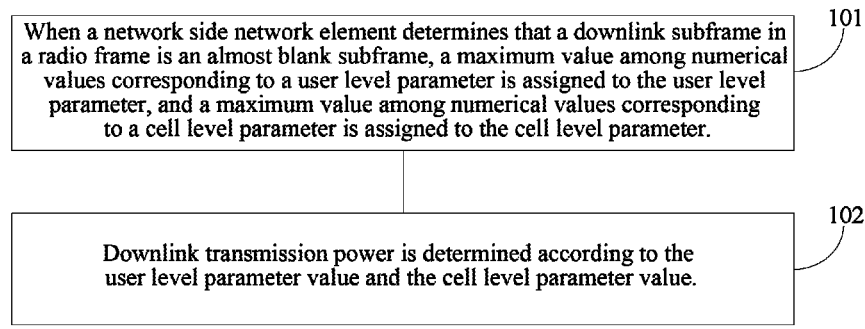
FIG. 1 is an implementation flowchart of a method for improving downlink transmission power according to the embodiment of the present document.

FIG. 1 is an implementation flowchart of a method for improving downlink transmission power according to the embodiment of the present document. As illustrated in FIG. 1, the method comprises:

in step 101, when a network side network element determines that a downlink subframe in a radio frame is an almost blank subframe, a maximum value among numerical values corresponding to a user level parameter $P_A$ is assigned to the user level parameter, and a maximum value among numerical values corresponding to a cell level parameter $P_B$ is assigned to the cell level parameter; and in step 102, downlink transmission power is determined according to the user level parameter $P_A$ value and the cell level parameter $P_B$ value.

Here, the almost blank subframe is a subframe, which is transmitted by a network side network element (e.g., a macro station) and where physical downlink control channel and downlink data channel are almost blank in a time domain enhanced cell interference coordination technology; and the network side network element may be a macro station and may also be a micro station.

The numerical values corresponding to the user level parameter $P_A$ may be numerical values in a set $\{-6, -4.77, -3, -1.77, 0, 1, 2, 3\}$; and the numerical values corresponding to the cell level parameter $P_B$ may be numerical values in a set $\{0, 1, 2, 3\}$.

Preferably, after the downlink transmission power is determined according to the user level parameter $P_A$ value and the cell level parameter $P_B$ value, the method further comprises:

the network side network element determining whether the downlink transmission power is greater than radio-frequency maximum power of the network side network element, and if the downlink transmission power is greater than the radio-frequency maximum power of the network side network element, assigning a secondary maximum value among the numerical values corresponding to the user level parameter to the user level parameter $P_A$, and assigning a secondary maximum value among the numerical values corresponding to the cell level parameter to the cell level parameter $P_B$;

determining the downlink transmission power again according to the user level parameter $P_A$ value and the cell level parameter $P_B$ value; and sequentially cycling until the determined downlink transmission power is less than or equal to the radio-frequency maximum power of the network side network element.

Preferably, determining the downlink transmission power according to the user level parameter $P_A$ value and the cell level parameter $P_B$ value comprises:

determining $p_A$ according to the user level parameter $P_A$ value, wherein $p_A$ is a ratio of subcarrier power corresponding to a data section in an orthogonal frequency division multiplexing symbol not containing pilot to subcarrier power corresponding to a pilot section; determining $p_B$ according to the cell level parameter $P_B$ value, wherein $p_B$ is a ratio of subcarrier power corresponding to a data section in an orthogonal frequency division multiplexing symbol containing pilot to subcarrier power corresponding to a pilot section; and determining the downlink transmission power according to the user level parameter value, the cell level parameter value, $p_A$ and $p_B$.

Here, in a 4-port transmit diversity mode of precoding, under a non-multi-user Multiple-Input Multiple-Output (MIMO) technology, a relationship between $P_A$ and $p_A$ may be $p_A=P_A$ or $p_A=P_A+3$.

$P_B$ is an index of $p_B/p_A$, and $P_B$ corresponds to $p_B/p_A$ one by one.

After the $P_B$ value is determined, the value of the $p_B$ may be determined according to a one-to-one correspondence between $P_B$ and $p_B/p_A$, and further the downlink transmission power is determined according to $P_A$, $P_B$, $p_B/p_A$, configuration information of a physical layer, etc.; When the determined downlink transmission power exceeds the radio frequency capability of the network side network element, i.e., when the determined downlink transmission power is greater than the radio frequency maximum power of the network side network element, assignment is performed again to the user level parameter $P_A$ and the cell level parameter $P_B$, a secondary maximum value among the numerical values corresponding to the user level parameter and a secondary maximum value among the numerical values corresponding to the cell level parameter are respectively assigned, then $p_A$ and $p_B$ are determined according the $P_A$ value and the $P_B$ value obtained after reassignment, new downlink transmission power is determined, sequentially cycling is performed until the determined downlink transmission power is less than or equal to the radio frequency maximum power of the network side network element, and at this moment, the determined latest downlink transmission power is the maximum downlink transmission power in the radio frequency capability range of the network side network element.

Since the assignment of $P_A$ and $P_B$ can be adjusted in the embodiment of the present document, the downlink transmission power may be adjusted according to the assignment of $P_A$ and $P_B$ such that the downlink transmission power value is the maximum value under the condition that the radio frequency capability of the network side network element is not exceeded, thus the performance of the eICIC technology can be improved and the performance of the LTE system can be improved.

Figure 2:
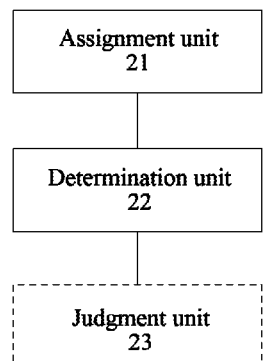
FIG. 2 is a structural schematic diagram of a network side network element for improving downlink transmission power according to the embodiment of the present document.

The embodiment of the present document further provides a network side network element for improving downlink transmission power applied to the method. As illustrated in FIG. 2, the network side network element comprises:

an assignment unit 21 configured to, when a network side network element determines that a downlink subframe in a radio frame is an almost blank subframe, assign a maximum value among numerical values corresponding to a user level parameter to the user level parameter, and assign a maximum value among numerical values corresponding to a cell level parameter to the cell level parameter; and a determination unit 22 configured to determine downlink transmission power according to the user level parameter value and the cell level parameter value.

Preferably, the network side network element further comprises:

a judgment unit 23 configured to determine whether the downlink transmission power is greater than radio-frequency maximum power of the network side network element;

the assignment unit 21 is further configured to, if the downlink transmission power is greater than the radio-frequency maximum power of the network side network element, assign a secondary maximum value among the numerical values corresponding to the user level parameter to the user level parameter, and assign a secondary maximum value among the numerical values corresponding to the cell level parameter to the cell level parameter; and the determination unit 22 is further configured to determine the downlink transmission power according to the user level parameter value and the cell level parameter value obtained after assignment, and sequentially cycle until the determined downlink transmission power is less than or equal to the radio-frequency maximum power of the network side network element.

Figure 3:
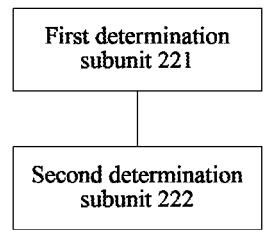
FIG. 3 is a structural schematic diagram of a determination unit according to the embodiment of the present document.

Preferably, as illustrated in FIG. 3, the determination unit 22 comprises:

a first determination subunit 221 configured to determine $p_A$ according to the user level parameter $P_A$ value, wherein $p_A$ is a ratio of subcarrier power corresponding to a data section in an orthogonal frequency division multiplexing symbol not containing pilot to subcarrier power corresponding to a pilot section; and determine $p_B$ according to the cell level parameter $P_B$ value, wherein $p_B$ is a ratio of subcarrier power corresponding to a data section in an orthogonal frequency division multiplexing symbol containing pilot to subcarrier power corresponding to a pilot section; and a second determination subunit 222 configured to determine the downlink transmission power according to the user level parameter $P_A$ value, the cell level parameter $P_B$ value, $p_A$ and $p_B$.

The embodiment of the present document further provides a computer storage medium, wherein computer executable instructions are stored in the computer storage medium and the computer executable instructions are used for executing the method for improving downlink transmission power provided by the embodiment.

During actual application, the assignment unit 21, the determination unit 22, the judgment unit 23, the first determination unit 221 and the second determination unit 22 may be implemented by a Central Processing Unit (CPU), a Digital Signal Processor (DSP), a Field Programmable Gate Array (FPGA) or the like; and the CPU, the DSP, the FPGA may be built in a data query system.

One skilled in the field should understand that the embodiments of the present document may be provided as methods, systems or computer program products. Therefore, the present document may adopt the form of hardware embodiments, software embodiments or embodiments of hardware and software combinations. In addition, the present document may adopt the form of computer program products which are implemented on one or more computer-available storage mediums (including but not limited to magnetic disk memories, optical memories and the like) which include computer-available program codes.

The present document is described by referring to flowcharts and/or block diagrams of the method, the apparatus (system) and the computer program product according to the embodiments of the present document. It should be understood that each process and/or block in the flowcharts and/or block diagrams and combinations of processes and/or blocks in the flowcharts and/or block diagrams may be implemented through computer program instructions. These computer program instructions may be provided to processors of general-purpose computers, special-purpose computers, embedded computers or other programmable data processing devices to produce a machine, such that instructions executed through processors of computers or other programmable data processing devices produce apparatuses for implementing functions designated in one process or more processes in the flowcharts and/or one block or more blocks in the block diagrams.

These computer program instructions may also be stored in computer-readable memories which can guide computers or other programmable data processing devices to work in a specific manner, such that the instructions stored in the computer-readable memories produce products comprising instruction devices, and the instruction devices realize functions designated in one process or more processes in the flowcharts and/or one block or more blocks in the block diagrams.

These computer program instructions may also be loaded to computers or other programmable data processing devices, such that a series of operation steps are executed on the computers or other programmable devices to perform processing realized by the computers, such that the instructions which are executed on the computers or other programmable devices provide steps for realizing functions designated in one process or more processes in the flowcharts and/or one block or more blocks in the block diagrams.

What are described above are just implementation modes of the embodiments of the present document. It should be pointed out that one skilled in the art can make various improvements and modifications without departing from the principle of the embodiments of the present document. However, such improvements and modifications shall also be viewed as covered by the protection scope of the embodiments of the present document.

INDUSTRIAL APPLICABILITY

The embodiments of the present document can adjust assignments to the user level parameter $P_A$ value and the cell level parameter $P_B$ value, then adjust $p_A$ and $p_B$ and adjust the downlink transmission power according to the adjusted user level parameter $P_A$ value, the cell level parameter $P_B$ value, $p_A$ and $p_B$, such that the downlink transmission power value is enabled to be the maximum value under the condition that the radio-frequency capability of the network side network element is not exceeded, thus the performance of the eICIC technology can be improved and the performance of the LTE system can be improved.

What is claimed is:

1. A method for improving downlink transmission power, comprising:
   when a network side network element determines that a downlink subframe in a radio frame is an almost blank subframe, setting a user level parameter with a maximum value among numerical values corresponding to the user level parameter, and setting a cell level parameter with a maximum value among numerical values corresponding to the cell level parameter; and
   determining downlink transmission power according to the user level parameter value and the cell level parameter value;
   after determining the downlink transmission power according to the user level parameter value and the cell level parameter value, the method further comprises:
   the network side network element determining whether the downlink transmission power is greater than radio-frequency maximum power of the network side network element, and if the downlink transmission power is greater than the radio-frequency maximum power of the network side network element, assigning a secondary maximum value among the numerical values corresponding to the user level parameter to the user level parameter, and assigning a secondary maximum value among the numerical values corresponding to the cell level parameter to the cell level parameter;
   determining the downlink transmission power again according to the user level parameter value and the cell level parameter value; and
   sequentially cycling until the determined downlink transmission power is less than or equal to the radio-frequency maximum power of the network side network element.

2. The method according to claim 1, wherein determining the downlink transmission power according to the user level parameter value and the cell level parameter value comprises:
   Determining $p_A$ according to the user level parameter value, wherein $p_A$ is a ratio of subcarrier power corresponding to a data section in an orthogonal frequency division multiplexing symbol not containing pilot to subcarrier power corresponding to a pilot section; determining $p_B$ according to the cell level parameter value, wherein $p_B$ is a ratio of subcarrier power corresponding to a data section in an orthogonal frequency division multiplexing symbol containing pilot to subcarrier power corresponding to a pilot section; and
   determining the downlink transmission power according to the user level parameter value, the cell level parameter value, $p_A$ and $p_B$.

3. A non-transitory computer storage medium, in which computer executable instructions are stored and are used for executing the method for improving downlink transmission power according to claim 2.

4. A non-transitory computer storage medium, in which computer executable instructions are stored and are used for executing the method for improving downlink transmission power according to claim 1.

5. A network side network element for improving downlink transmission power, comprising:
   an assignment unit configured to, when a network side network element determines that a downlink subframe in a radio frame is an almost blank subframe, set a user level parameter with a maximum value among numerical values corresponding to the user level parameter, and set a cell level parameter with a maximum value among numerical values corresponding to the cell level parameter; and
   a determination unit configured to determine downlink transmission power according to the user level parameter value and the cell level parameter value;
   wherein the network side network element further comprises:
   a judgment unit configured to determine whether the downlink transmission power is greater than radio-frequency maximum power of the network side network element;
   the assignment unit is further configured to, if the downlink transmission power is greater than the radio-frequency maximum power of the network side network element, assign a secondary maximum value among the numerical values corresponding to the user level parameter to the user level parameter, and assign a secondary maximum value among the numerical values corresponding to the cell level parameter to the cell level parameter; and
   the determination unit is further configured to determine the downlink transmission power according to the user level parameter value and the cell level parameter value obtained after assignment, and sequentially cycle until the determined downlink transmission power is less than or equal to the radio-frequency maximum power of the network side network element.

6. The network side network element according to claim 5, wherein the determination unit comprises:
   a first determination subunit configured to determine $p_A$ according to the user level parameter value, wherein $p_A$ is a ratio of subcarrier power corresponding to a data section in an orthogonal frequency division multiplexing symbol not containing pilot to subcarrier power corresponding to a pilot section; and determine $p_B$ according to the cell level parameter value, wherein $p_B$ is a ratio of subcarrier power corresponding to a data section in an orthogonal frequency division multiplexing symbol containing pilot to subcarrier power corresponding to a pilot section; and
   a second determination subunit configured to determine the downlink transmission power according to the user level parameter value, the cell level parameter value, $p_A$ and $p_B$.

* * * * *